(12) United States Patent
Schultes et al.

(10) Patent No.: US 9,457,484 B2
(45) Date of Patent: Oct. 4, 2016

(54) PLIERS

(75) Inventors: Stefan Schultes, Solingen (DE);
Guenter Schulz, Remscheid (DE)

(73) Assignee: Knipex-Werk C. Gustav Putsch KG, Wuppertal (DE)

( * ) Notice: Subject to any disclaimer, the term of this patent is extended or adjusted under 35 U.S.C. 154(b) by 170 days.

(21) Appl. No.: 13/578,858

(22) PCT Filed: Dec. 6, 2010

(86) PCT No.: PCT/EP2010/068925
§ 371 (c)(1),
(2), (4) Date: Aug. 14, 2012

(87) PCT Pub. No.: WO2011/082914
PCT Pub. Date: Jul. 14, 2011

(65) Prior Publication Data
US 2013/0047441 A1 Feb. 28, 2013

(30) Foreign Application Priority Data
Dec. 17, 2009 (DE) .......................... 10 2009 059 198

(51) Int. Cl.
*B26B 13/26* (2006.01)
*B23D 29/02* (2006.01)
*B25B 7/00* (2006.01)
(Continued)

(52) U.S. Cl.
CPC ............. *B26B 13/26* (2013.01); *B23D 29/026* (2013.01); *B25B 7/00* (2013.01); *B25B 7/02* (2013.01); *B25B 7/08* (2013.01)

(58) Field of Classification Search
CPC . B26B 13/26; B23D 29/26; B25B 7/00–7/10

USPC ........................... 30/259, 258, 271, 193, 186
See application file for complete search history.

(56) References Cited

U.S. PATENT DOCUMENTS

| | | | | | |
|---|---|---|---|---|---|
| 1,104,768 | A | * | 7/1914 | Bernard ............... | B23D 29/026 125/23.01 |
| 1,716,180 | A | * | 6/1929 | Marler ............................ | 30/186 |
| 1,831,609 | A | * | 11/1931 | Schroder ........................ | 30/186 |

(Continued)

FOREIGN PATENT DOCUMENTS

| DE | FR 2 137 336 | 12/1972 |
|---|---|---|
| DE | 26 04 713 | 8/1976 |

(Continued)

OTHER PUBLICATIONS

International Search Report of PCT/EP2010/068925, Mar. 11, 2011.

(Continued)

*Primary Examiner* — Laura M Lee
(74) *Attorney, Agent, or Firm* — Collard & Roe, P.C.

(57) ABSTRACT

The invention relates to a pliers, in particular a center cutter, having two pliers limbs (6, 7) arranged to cross in a joint which forms a pivot axis (8), the two pliers limbs (6, 7) forming, on one side of the joint, interacting working regions (2, 3) that have free ends (15, 16), and the pliers limbs having gripping limbs (10, 11) on the other side of the joint. In order to improve a pliers of the kind specified at the beginning in such a way that an advantageous design structure is achieved for the greatest possible force transmission ratio, it is proposed that one of the pliers limbs (6) is formed in the shape of a U on the joint side and that the pivot axis (8) passes through the U-limb (12).

5 Claims, 5 Drawing Sheets

(51) Int. Cl.
  *B25B 7/02* (2006.01)
  *B25B 7/08* (2006.01)

(56) References Cited

U.S. PATENT DOCUMENTS

| | | | | |
|---|---|---|---|---|
| 1,963,564 A | * | 6/1934 | Smith et al. | 30/186 |
| 1,995,044 A | * | 3/1935 | Smith | 30/186 |
| 2,295,385 A | * | 9/1942 | Connors | 30/124 |
| D151,791 S | * | 11/1948 | Smith | D8/5 |
| 2,574,354 A | * | 11/1951 | Smith | 30/186 |
| 2,713,719 A | * | 7/1955 | Coplen | 30/254 |
| 2,734,268 A | * | 2/1956 | Grinling | 30/186 |
| 2,807,087 A | * | 9/1957 | Smith | 30/186 |
| 5,003,695 A | | 4/1991 | Lipscomb et al. | |
| 5,014,432 A | | 5/1991 | Putsch et al. | |
| 7,845,255 B2 | | 12/2010 | Heinsohn | |

FOREIGN PATENT DOCUMENTS

| | | | |
|---|---|---|---|
| DE | 88 03 016 | 7/1989 | |
| DE | 100 08 854 | 9/2001 | |
| EP | 0 331 927 | 9/1989 | |
| FR | 2 300 634 | 9/1976 | |
| GB | 2050226 | * 1/1981 | A01G 3/02 |
| WO | WO 2006/108804 | 10/2006 | |

OTHER PUBLICATIONS

International Preliminary Report on Patentability and Written Opinion of the International Searching Authority in PCT/EP2010/068925, Jul. 4, 2012.

* cited by examiner

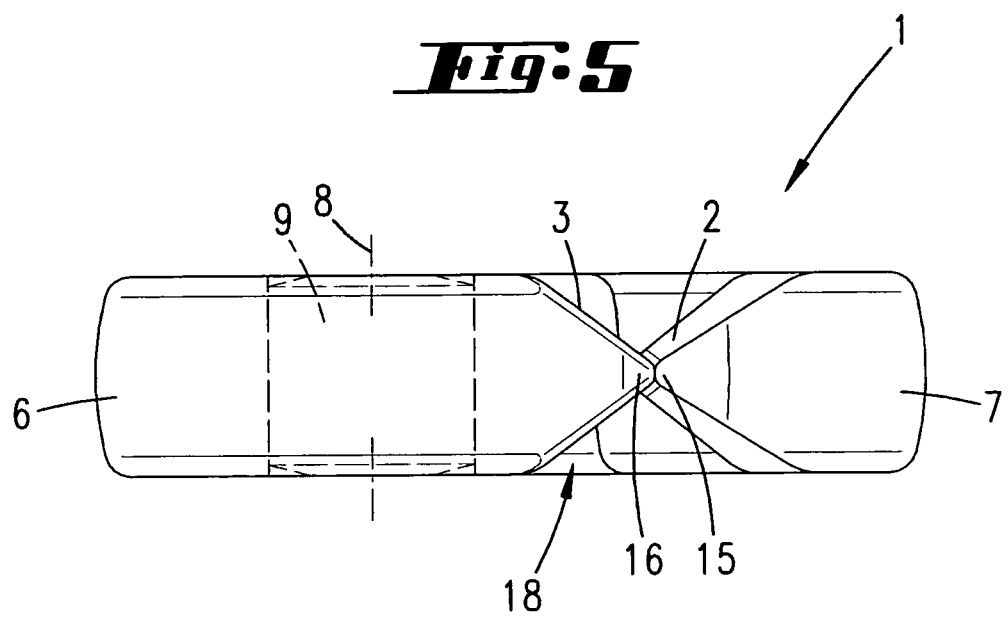

PLIERS

CROSS REFERENCE TO RELATED APPLICATIONS

This application is the National Stage of PCT/EP2010/068925 filed on Dec. 6, 2010, which claims priority under 35 U.S.C. §119 of German Application No. 10 2009 059 198.2 filed on Dec. 17, 2009, the disclosure of which is incorporated by reference. The international application under PCT article 21(2) was not published in English.

The invention relates to a pliers, in particular formed as a center cutter, having two pliers limbs arranged to cross in a joint which forms a pivot axis, the two pliers limbs forming, on one side of the joint, interacting working regions that have free ends, and the pliers limbs having gripping limbs on the other side of the joint, the pliers limbs furthermore being pivotable relative to one another about a pivot axis formed in the joint.

Pliers of this kind are already known in a multiplicity of configurations. Reference is made for example to EP 331 927 A1, DE 88 03 016 U1 and WO 2006/108 804 A1.

In the known pliers, in order to achieve an advantageous transfer of force, the pivot axis in a middle region of the pliers is brought as near as possible to the gripping limb end of the working regions, generally the cutting edges.

It is an object of the invention to improve a pliers of the kind specified at the beginning in such a way that an advantageous design structure is achieved for the greatest possible force transmission ratio.

A possible solution to this problem, according to a first aspect of the invention, is given by the subject matter described herein, it being specified in this case that one of the pliers limbs is formed in the shape of a U on the joint side and that the pivot axis passes through the U-limb. The U-shaped configuration of one of the pliers limbs in the joint region, thus in the region of the articulated connection of the pliers limbs, in which region the pliers limbs also cross, makes it possible for the pivot axis and the working region of the pliers limb in question to be arranged laterally offset relative to one another with respect to a longitudinal extent of the pliers. There is preferably a single articulation point on the pliers. The pivot axis does not lie in alignment with a working region.

Further features of the invention are described below, also in the description of the figures, often in their preferred association with claim concepts already explained above; they may however also be of importance in association with only one or more individual features which are described here, in particular features of the claims already dealt with, or in another overall concept.

Thus it is first of all preferably provided that the U-limbs are different in length. It is further preferred that the pivot axis is provided in the shorter U-limb. The different length relates to a free protruding length with reference to longitudinal axes of the two U-limbs. It is also preferred that these different lengths are specified with respect to a longitudinal axis of the pliers as a whole, as is further explained below.

It is moreover preferred that both U-limbs form a region that protrudes freely toward the pliers tip, formed by the tips of the working regions.

It is further provided that the pivot axis is arranged offset toward the free end with respect to a peripheral edge of the crosspiece of the U, the peripheral edge facing toward the free ends of the working regions. The crosspiece links the two U-limbs to one another and has accordingly a front peripheral edge facing toward the free end of the pliers, thus on the tip side. In this regard, the pivot axis, at least the geometric pivot axis, is also at the front. Thus advantageous lever ratios can be achieved. Preferably also not only the geometric pivot axis is at the front in the specified sense, but also a structural part relating to this, thus for example a joint bolt, is at the front overall.

It is also preferably provided that a part region of a working region moves, during opening of the pliers, with respect to an overall direction of extent of the pliers, out of a region at the tip of the pliers, i.e. usually a tip formed by the free ends of the working regions, toward a region at the gripping end of the pliers. This is preferably a part region of the working region that is located on the U-limb which forms the working region of this pliers limb. In further regard to this, the arrangement of the pivot axis relative to the working region of the pliers limb formed to be U-shaped on the joint side is described. The overall direction of extent is determined primarily by the gripping regions of the pliers limbs, their direction of extent, or a gripping axis of the hand enclosing the gripping regions. More preferably, the working regions also extend substantially in the same direction. In particular, they may also run on a curve, but aligned on this overall direction of extent.

It is also preferred that the working region of the pliers limb that is formed in the shape of a U moves toward the gripping limb of the other pliers limb when the pliers is opened. It is as it were therefore moved downward, if the working regions are seen as "above".

The free ends of the working regions are preferably also on the other side of the pivot axis with respect to the above-mentioned overall direction of extent of the pliers and specifically that of the gripping limb.

The pivot axis mentioned furthermore runs also preferably with a lateral spacing from the working region of the other pliers limb and passes through the other pliers limb on the outside with respect to the working region of this other pliers limb.

Furthermore, it is preferred that that in each case, when the pliers is closed, a working region in each case of one of the pliers limbs, which working region runs with a lateral spacing with respect to the pivot axis, extends on the gripping region side in the direction of the crosspiece of the U as far as beyond the pivot axis. Advantageously, this can apply here also to both working regions, which have an extent of this kind. Such an extent, with reference to the portion on the gripping region side, is preferably also visible for the closed pliers.

It is further preferred that the U-limb of the pliers limb that is formed to be U-shaped on the joint region side, said U-limb having the pivot axis, does not form a working region on this U-limb. There is only an outward curving of the pliers limb in the direction of the pliers tip, which serves merely for the formation of the pivot axis, usually by receiving a suitable bolt.

The working regions are preferably at the side with reference to a longitudinal axis of the pliers, which corresponds to a central elongate extent of the gripping regions or of the gripping axis, already mentioned, of a hand enclosing the gripping regions.

The invention is explained further below with reference to the accompanying drawing, which however illustrates only one embodiment. In the drawings, FIG. 1 shows a plan view of the pliers;

FIG. 5 shows an end view of the pliers according to FIG. 1.

Figure 1:
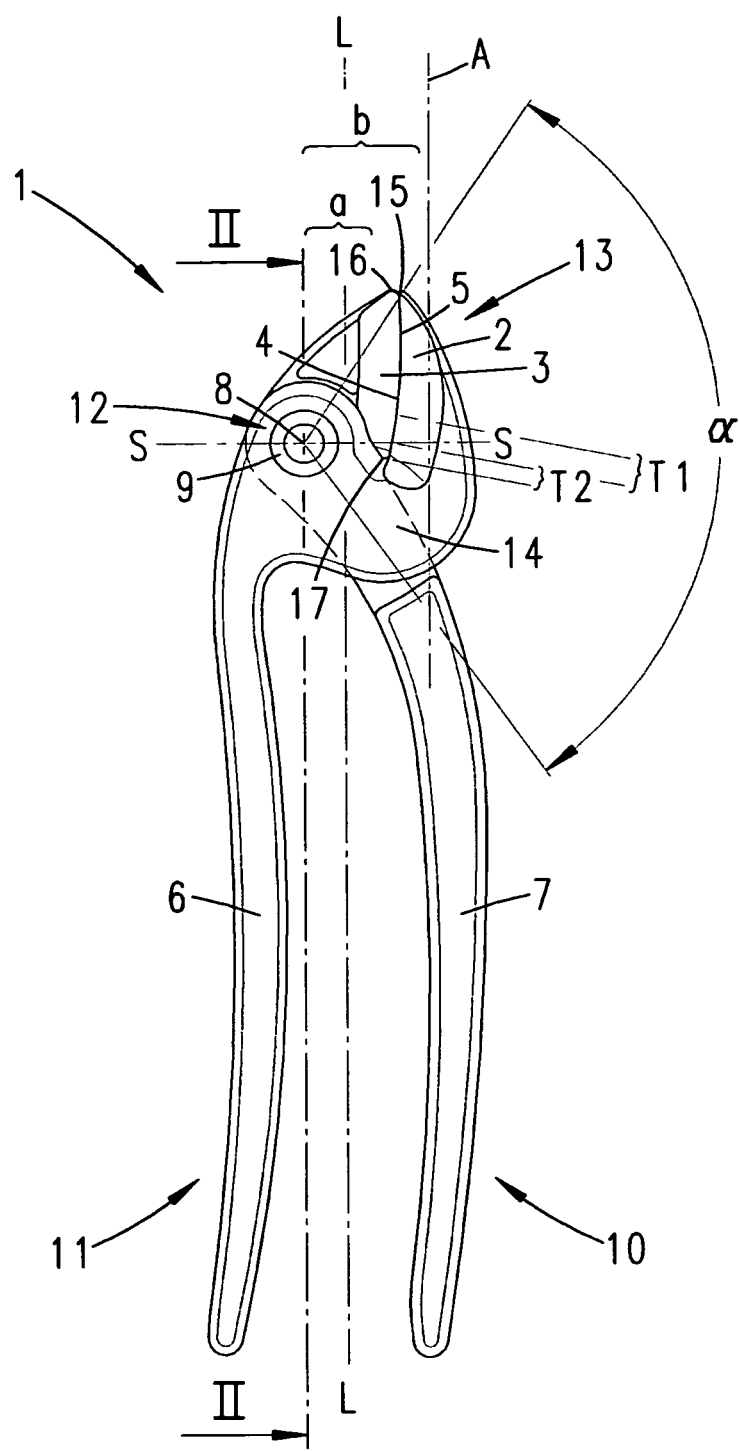

Shown and described, in first instance with reference to FIG. 1, is a pliers 1, which is formed as a center cutter. The working regions 2, 3 have cutting edges 4, 5, which in the closed state of the pliers 1, lie with their cutting tips against one another.

The pliers has furthermore two pliers limbs 6, 7, each of which is formed integrally with the associated joint region, i.e. the region in which the pliers limbs 6, 7 pivot, one on the other. A pivot axis 8 is also provided, which is formed in the exemplary embodiment by means of the joint bolt 9. The pliers limbs 6, 7 are preferably formed integrally with the working regions 2, of a respective pliers limb. These are preferably forged parts, as usual in the case of pliers of this kind. The working regions 2, 3 also extend in each case with a lateral spacing a and b respectively with respect to the pivot axis 8. "Working region" comprises here the entire surface for forming the respective cutting edge, which is for example ground and is machined on the relevant portions of the pliers limb. The spacing a and b respectively is therefore obviously an average distance of such a working region on the overall surface extent apparent for example in FIG. 1. The spacing a and b respectively preferably corresponds to a prescribed dimension of such a working region, for example along the perpendicular S, (—a—the basic dimension, or more, and twice the dimension or more—b—).

The pliers limbs 6, 7 have gripping regions 10, 11 in the lower region relative to the joint. "Lower" refers here to the illustration of FIG. 1. Furthermore, the pliers 1 has a longitudinal axis L-L. This corresponds to the overall direction of extent. The longitudinal axis lies midway between the pliers limbs 6, 7 and corresponds in the exemplary embodiment also to the gripping axis of a hand enclosing the gripping regions 10, 11 of the pliers limbs.

The pliers limb 6 is formed to be U-shaped overall in the region of the limb which is associated with the joint bolt 9 and the working region 2. It is possible to distinguish between a first U-limb 12 and a second U-limb 13. The U-limbs 12, 13 are in the exemplary embodiment connected integrally to one another in one piece by the crosspiece 14 of the U. It is also possible to speak in particular of a Y-shaped configuration of the pliers limb 6, in particular in regard to the view from below according to FIG. 3.

Each of the U-limbs has a longitudinal axis. In regard to the U-limb 12, this longitudinal axis coincides with the section line II-II shown in FIG. 1. In regard to the U-limb 13, reference may be made to the longitudinal axis A.

The crosspiece 14 of the U forms a peripheral edge 17 that faces toward the free ends 15, 16 of the working regions 2, 3. The pivot axis 8 is arranged offset toward the free ends 15, 16 of the pliers 1, with respect to the peripheral edge mentioned. In the exemplary embodiment, this is also shown in that the already-mentioned perpendicular S to the longitudinal axis L-L, laid out through the pivot axis 8, runs above, i.e. on the side of the free ends 15, 16 of the working regions, with respect to the peripheral edge 17.

Figure 4:
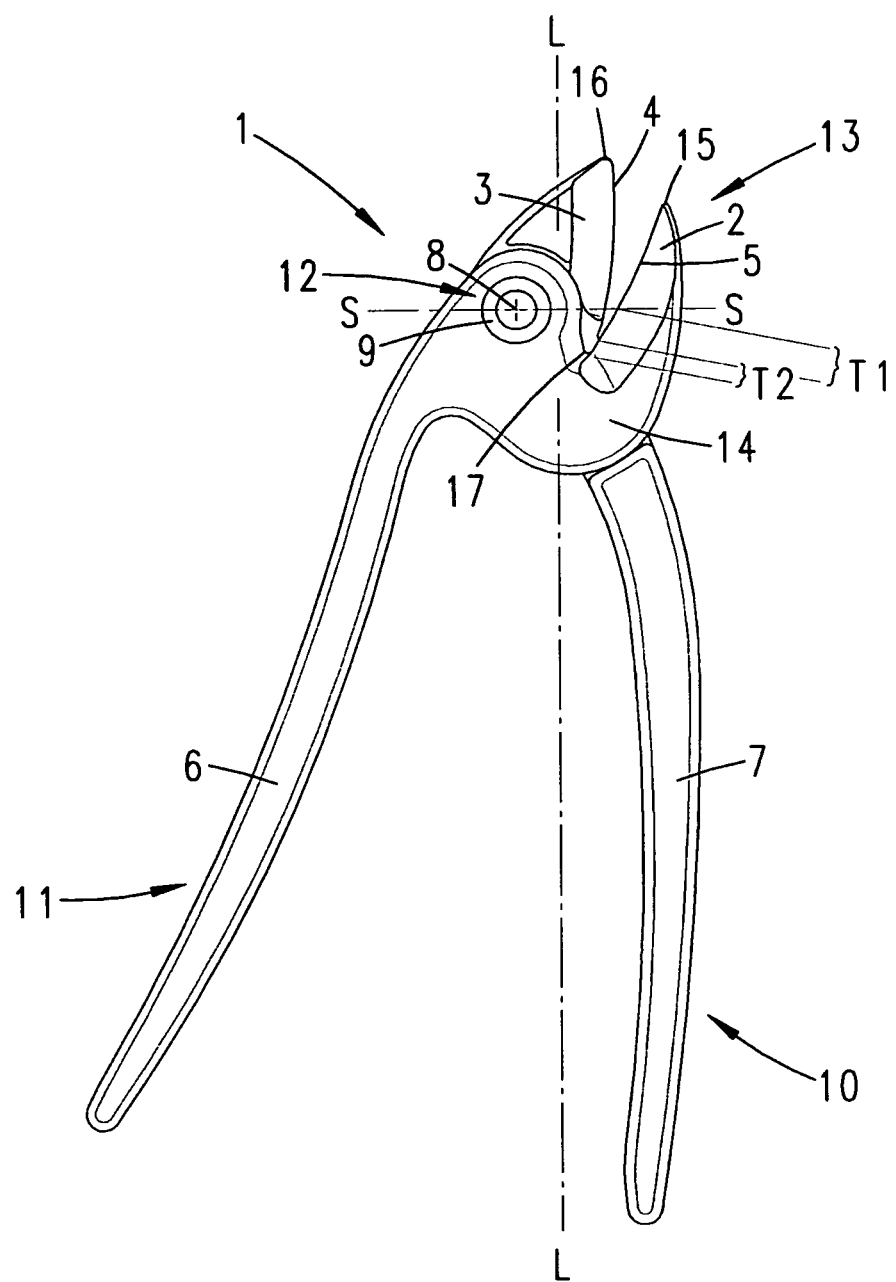
FIG. 4 shows the pliers according to FIG. 1 in the open position.

In the course of opening the pliers, see also the open position according to FIG. 4, a part region T1 of the working region 2, specifically the cutting formation 5 of the pliers limb 6, moves from a region on the tip side of the pliers 1, relative to the pivot axis 8 and the perpendicular S mentioned, toward a region on the gripping limb side of the pivot axis 8 and the perpendicular S mentioned. This therefore allows a very advantageous lever ratio to be achieved in respect of for example a wire or the like to be cut by the pliers, which wire or the like can then be laid onto the crosspiece 14 of the U-limb, its peripheral edge 17, or as widely as possibly.

In the exemplary embodiment illustrated, it is also provided that when the pliers is closed, see FIG. 1, a part region T2 extends on the other side, the gripping region side, i.e. below the pivot axis 8, this also here with respect to a perpendicular S to substantially the direction of extent of the gripping limb 10, 11, shown in the drawing by the longitudinal axis L-L of the pliers 1.

T1 is also preferably greater than T2. T2 further corresponds preferably to $1/20$ to $1/3$ of the length of the working region, measured in the direction of extent of the working region 2 of the pliers limb 6, on which the regions T1 and T2 are to be seen. Here, in further detail, T2 is preferably $1/3$ to $2/3$ the length of T1. As regards the mentioned ranges of the lengths of T1 and T2, all intermediate values are also to be included in the disclosure, in particular in $1/10$ steps and $1/10$ range boundary steps.

The working region 5 of the pliers limb 6 is moreover preferably limited to the region of the U-limb 13.

Preferably no working region is provided in the region of the crosspiece of the U. The peripheral edge 17 is preferably not formed as a cutting edge. The U-limb 12 ends by protruding freely in the direction of the pliers tip, in the case of the exemplary embodiment with a circular edge portion, the circle being formed with a center in the pivot axis 8.

A corresponding part region of the working region 3 lies opposite the part region T2, in the closed condition, specifically the cutting edge 4 of the pliers limb 7, see also FIG. 1 in this connection.

As will be further apparent from the illustrations of FIGS. 1 and 3, the portion of the pliers limb 7 on the working region side, thus the portion above the pivot axis 8 and the portion below the pivot axis 8, enclose an angle α of about 112°, when reduced to the run of the pliers limb beginning below the pivot axis 8 as far as the bend into the gripping region 10. Preferred however is an angle in the range from 160° to 75°, all intermediate values also being included in the disclosure in respect of this range, in particular in 1° steps and 1° range boundary steps.

Figure 2:
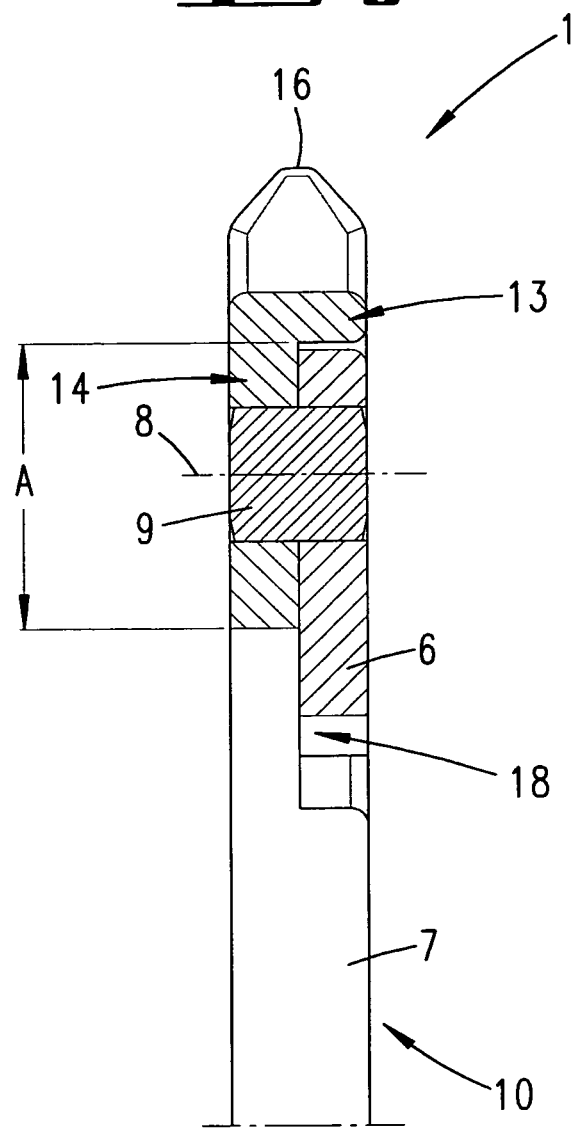
FIG. 2 shows a section through the subject matter according to FIG. 1, sectioned along the line II-II.
Figure 3:
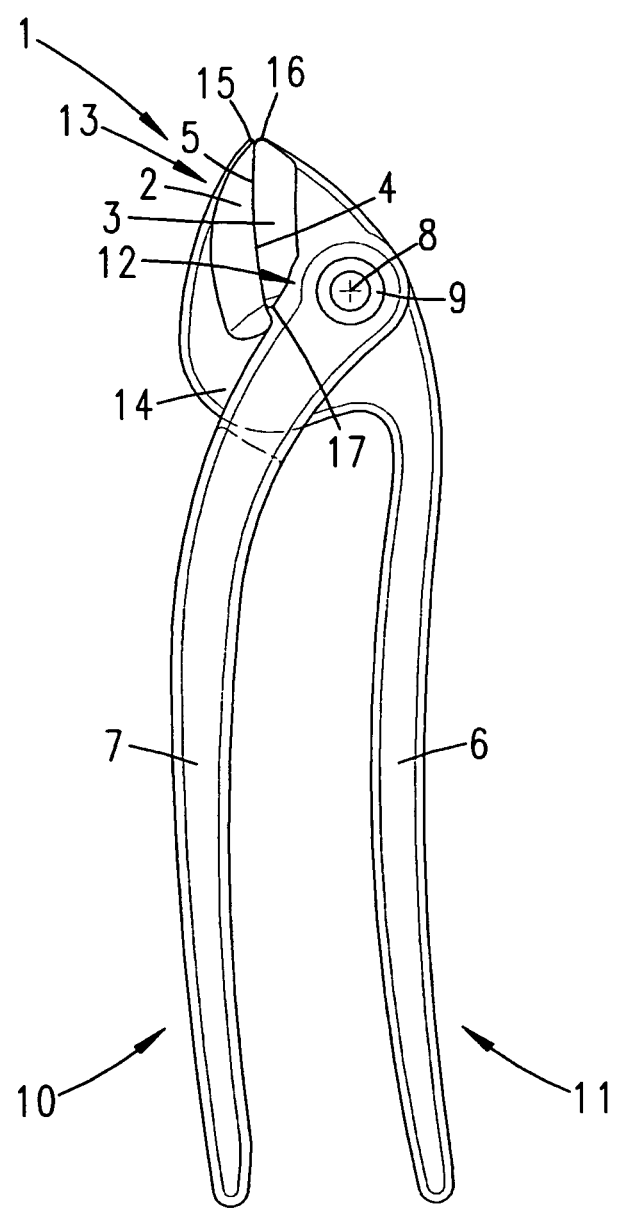
FIG. 3 shows a rear view relating to the representation according to FIG. 1.

The cross-sectional illustration of FIG. 2, together also with the illustrations of FIGS. 1, 3 and 4 allow it to be seen that a relatively large region A is realised in the design, in which the pliers limbs lie against one another during pivoting. This reinforces the stability of the pliers.

The pliers limb 7 forms here in particular a set-back portion 18, which surrounds, in an outwardly open manner, the pliers limb 6 that lies against it, based on the illustration according to FIG. 2.

The pliers limb 6 is thickened on the other side, i.e. above and below the region of engagement with the pliers limb 7, in such a way that apart from the region visible in the illustration according to FIG. 2, the same thickness results as for the pliers limb 7. The U-limb 12 is formed with a thickness over the region which comes to overlap the pliers limb 7 in the position of maximum opening, see FIG. 4, which thickness corresponds to the thickness of the pliers limb 7 visible in FIG. 2. In connection with this, the pliers limb then thickens toward the free end 16 of the working region 4, this being also apparent from the end view according to FIG. 5.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

The invention claimed is:

1. Pliers comprising a center cutter, having a first limb and a second limb arranged to cross in a single joint which forms a pivot axis, the first limb and the second limb being connected with each other in the pivot axis, the first limb and the second limb forming, on one side of the joint, interacting working regions that have free ends, and the first limb and the second limb having gripping limbs on the other side of the joint, wherein the first limb comprises a U-shaped region, the U-shaped region having a first U-limb connected to a second U-limb via a crosspiece, wherein the pivot axis passes through the second U-limb, wherein both the first U-limb and the second U-limb form a region that protrudes freely toward a pliers tip, the pliers tip being formed by tips of the interacting working regions, wherein the pivot axis is arranged, both in a closed position of the pliers as well as in an open position of the pliers, offset toward the free ends with respect to a peripheral edge of the crosspiece of the U-shaped region, the peripheral edge facing toward the free ends of the working regions, wherein each of the interacting working regions comprises a respective cutting edge, wherein the cutting edge of the first limb is disposed on the first U-limb, wherein each tip of the interacting working regions is a respective cutting tip, wherein the cutting edges lie with the cutting tips against each other in the closed position of the pliers, wherein, seen in a representation in which the pivot axis appears to be a point, a first line perpendicular to a longitudinal axis of the pliers and running across the pivot axis runs between the peripheral edge and the free ends of the interacting working regions, wherein the peripheral edge of the crosspiece of the U-shaped region and a substantial length of the free ends of the interacting working regions are substantially aligned in the closed position of the pliers, and wherein the cutting edges extend substantially in a direction parallel to the longitudinal axis of the pliers and/or wherein the first U-limb and the second U-limb extend substantially in a direction parallel to the cutting edges.

2. Pliers according to claim 1, wherein the interacting working region of the first limb moves toward said gripping limb of the second limb when the pliers is opened.

3. Pliers according to claim 1, wherein a part region of the interacting working region of the first limb or the second limb moves, relative to the pivot axis, with respect to a longitudinal direction of the pliers, out of a region at the pliers tip at the free ends of the interacting working regions into a region on said gripping limb side of the pliers during opening of the pliers.

4. Pliers according to claim 1, wherein in each case, when the pliers is closed, each interacting working region is continually laterally spaced from the pivot axis and extends from a first side of the pivot axis to a second side of the pivot axis, the first side of the pivot axis facing the free ends of the working regions, and the second side of the pivot axis facing said gripping limb side of the pliers.

5. Pliers according to claim 1, wherein the second U-limb has no cutting edge.

* * * * *